(12) United States Patent
Nardi et al.

(10) Patent No.: US 8,073,597 B2
(45) Date of Patent: Dec. 6, 2011

(54) METHOD AND APPARATUS FOR PREDICTING VEHICLE ROLLOVER DURING A TRIP-OVER EVENT

(75) Inventors: Flavio Nardi, Farmington Hills, MI (US); Nikolai K. Moshchuk, Grosse Pointe, MI (US); Jihan Ryu, Rochester Hills, MI (US); Edward McLenon, White Lake, MI (US); O Kyung Kwon, Clarkston, MI (US); Bridget M. O'Brien-Mitchell, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 434 days.

(21) Appl. No.: 12/429,245

(22) Filed: Apr. 24, 2009

(65) Prior Publication Data
US 2010/0274450 A1    Oct. 28, 2010

(51) Int. Cl.
*G05D 3/00*    (2006.01)
(52) U.S. Cl. ........................................................ 701/45
(58) Field of Classification Search .............. 701/36–38, 701/45, 48, 65
See application file for complete search history.

(56) References Cited

U.S. PATENT DOCUMENTS 6,889,146 B2 * 5/2005 Sullivan et al. ................. 702/43
7,120,528 B2 * 10/2006 Salib et al. ...................... 701/45

* cited by examiner

*Primary Examiner* — Kim T Nguyen
(74) *Attorney, Agent, or Firm* — Quinn Law Group, PLLC

(57) ABSTRACT

A vehicle includes wheels, force sensors adapted for a vertical force and lateral force of each wheel, an onboard device, and a controller. The controller calculates vehicle values using the vertical force and lateral force, compares the values to a corresponding threshold, and automatically deploys the device when each element value does not exceed a corresponding threshold. A method for determining when to deploy an airbag includes measuring a vertical and lateral force at each wheel, and measuring a yaw rate and roll angle. A lateral velocity is calculated using the lateral force, and a lift of each wheel is calculated using the vertical force. The roll angle, roll rate, and stopping time are processed to generate a point on a 3D rollover plane. A rollover energy rate is calculated, and the airbag deploys when the point, rollover energy rate, and lift do not exceed a threshold.

14 Claims, 2 Drawing Sheets

US 8,073,597 B2

METHOD AND APPARATUS FOR PREDICTING VEHICLE ROLLOVER DURING A TRIP-OVER EVENT

TECHNICAL FIELD

The present invention relates to vehicle rollover detection, and more particularly to a method and a system for predicting a vehicle trip-over event.

BACKGROUND OF THE INVENTION

The National Highway Transportation Safety Administration (NHTSA) characterizes vehicle rollover events both by type and severity, with the most commonly occurring vehicle rollover event being a trip-over event. The term "trip-over event" describes a particular type of vehicle rollover event wherein the lateral motion of a vehicle is suddenly arrested by an opposing force such as soft or sandy soil, a curb, or a high-friction surface. In order to protect and contain vehicle occupants during a rollover event, modern vehicles are often equipped with rollover sensing systems. Such systems attempt to detect dynamic vehicle conditions that might be indicative of a rollover event. Positive rollover detection can be used to signal deployment of various onboard devices, e.g., seat belt tensioning devices, airbags, etc.

SUMMARY OF THE INVENTION

Accordingly, a method is provided in the form of a computer-executable control algorithm that when executed continuously monitors a set of vehicle values to determine whether a vehicle trip-over event is occurring. The algorithm can be stored or recorded in memory of an onboard electronic control unit or controller, and automatically executed upon start up of the vehicle. Once executed, a set of values is continuously monitored and compared to calibrated threshold values. Under certain conditions, the result of the value comparison can be used to signal for activation or deployment of various onboard devices, such as but not limited to side curtain airbags, seat belt tensioning devices, etc.

In particular, the algorithm utilizes a plurality of specially configured sensors, including a plurality of corner force sensors disposed at the four corners or wheels of the vehicle in order to accurately measure any vertical and lateral forces present at the respective force sensor positions. These values are in turn used to estimate vehicle mass and lateral velocity. The algorithm then determines a path the vehicle is likely to take, and whether a trip-over event is the likely result of such a path. If a trip-over event is indicated, the algorithm can provide an appropriate command or signal to an onboard device, or indirectly thereto via a deployment or activation algorithm, in order to ensure that the device or devices are activated or deployed.

Within the scope of the present invention, a vehicle includes a plurality of wheels, a force sensor connected to each of the corners of the vehicle, such as the wheels, for measuring vertical and lateral forces at each wheel. The vehicle also includes a deployable airbag and/or other onboard device, and a controller in continuous communication with each of the force sensors. The algorithm reads or receives the vertical and lateral force measurements from the force sensors, and in response thereto calculates a set of values. The set of values is compared to a corresponding minimum threshold value, and when each element or value of the set of values is less than the corresponding threshold for that particular value, the airbag device is automatically deployed or activated.

A method for optimally deploying an airbag in a vehicle includes measuring a vertical and a lateral force at each of a plurality of wheels of the vehicle, as well as a yaw rate and a roll angle of the vehicle. The method in the form of a computer-executable algorithm then calculates an estimated lateral velocity of the vehicle using the measured lateral force, as well as an amount of lift of each wheel using the measured vertical force. A central processing unit (CPU) of the controller processes the roll angle, the roll rate, and a calculated stopping time of the vehicle to thereby generate a point on a 3D rollover plane. This point, along with a calculated rollover energy rate of the vehicle and an amount of lift of the wheels, are each compared to a corresponding threshold. The controller automatically deploys or activates the airbag or other onboard device when each of the point, the rollover energy rate, and the amount of lift of the wheels does not exceed a calibrated minimum threshold.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
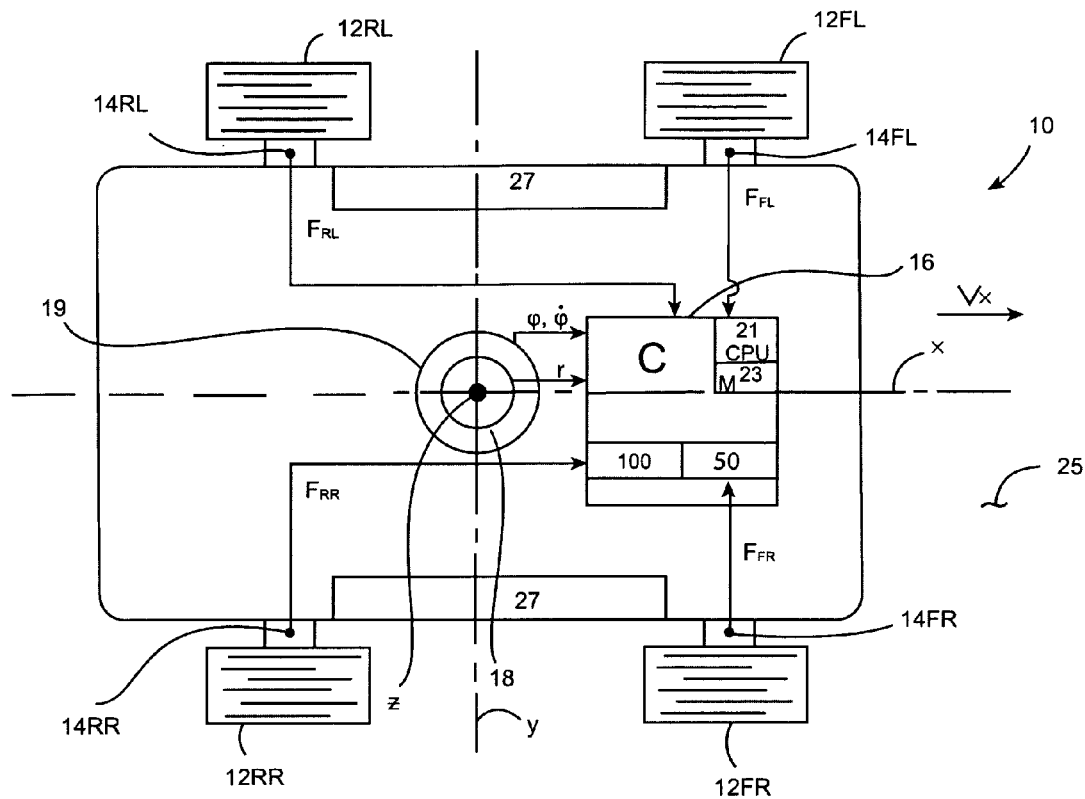
FIG. 1 is a schematic illustration of a vehicle having a system and method for optimizing an airbag deployment during a threshold rollover event.

Referring to the drawings wherein like reference numbers correspond to like or similar components throughout the several figures, and beginning with FIG. 1, a vehicle 10 travels at a forward velocity $V_x$, and includes a plurality of wheels each rotating in contact with a road surface 25. Each of the wheels is represented in FIG. 1 by its respective position on the vehicle 10, i.e., the front right wheel 12FR, the front left wheel 12FL, the rear left wheel 12RL, and the rear right wheel 12RR. Each of the wheels, collectively referred to as the wheels 12, is connected to a corner force sensor 14, such as a force transducer that generates an electrical signal related to the change in wheel force during wheel rotation. Each force sensor 14 is likewise represented in FIG. 1 by its respective position, i.e., 14FR, 14FL, 14RL, and 14RR. The collective set of force sensors 14, which can be configured as in-cylinder pressure sensors, metal-foil strain gages, piezoelectric devices, or any other suitable type of force sensor, are each hard-wired or in wireless communication with an electronic control unit or controller (C) 16 as described below.

The vehicle 10 has a vertical axis (z), a longitudinal axis (x), and a horizontal or lateral axis (y). A yaw rate sensor 18 and a roll rate sensor 19 are each connected to the vehicle 10 along or on the vertical axis (z). The yaw rate sensor 18 is suitably configured for detecting, sensing, or otherwise determining directly or via calculation a yaw rate (r) of the vehicle 10. Likewise, the roll sensor 19 is suitably configured for detecting, sensing, or otherwise determining a roll angle ($\phi$) of the vehicle 10 and, either directly or via derivation, a roll rate ($\dot\phi$) thereof. As with the sensors 14, the sensors 18 and 19 are hardwired to or in wireless communication with the controller 16.

The corner force sensors 14 are each configured to measure a respective corner force for a given front right (FR), front left (FL), rear right (RR), and rear left (RR) wheel. That is, the sensor 14FL that is connected to the wheel 12FL detects, senses, measures, or otherwise determines a corresponding force $F_{y,FL}$ in the lateral (y) direction, while the force sensors 14FR, 14RL, and 14RR each determine a corresponding lateral force of $F_{y,FR}$, $F_{y,RL}$, and $F_{y,RR}$, respectively. At the same time, the sensors 14 can each determine a vertical or z-axis force for a corresponding wheel 12, such that, collectively, a set of forces $F_{z,FL}$, $F_{z,FR}$, $F_{z,RL}$, and $F_{z,RR}$ are ultimately determined and transmitted to the controller 16 to determine whether any given wheel 12 is lifting or separating from the road surface 25, as will be described below.

Still referring to FIG. 1, the controller 16 includes a microprocessor or central processing unit (CPU) 21 that receives and processes various vehicle operating values, including the vehicle speed $V_x$, the various force values transmitted from the force sensors 14, the yaw rate (r) from the yaw rate sensor 18, and the roll angle ($\phi$) from the roll sensor 19. The controller 16 can be configured as a self-contained device, or can be part of a distributed or a central control module for the vehicle 10, thus having additional control modules and capabilities as might be necessary to execute all required system control functionality aboard the vehicle 10 in the desired manner.

Additionally, the controller 16 can be configured as a digital computer generally comprising, in addition to the CPU 21, sufficient memory (M) 23 such as, but not limited to, read only memory (ROM), random access memory (RAM), electrically-programmable read only memory (EPROM), etc. The controller 16 can include a high speed clock, analog to digital (A/D) and digital to analog (D/A) circuitry, and input/output circuitry and devices (I/O), as well as appropriate signal conditioning and buffer circuitry. Any algorithms resident in the controller 16 or accessible thereby, including the algorithm 100 described below with reference to FIGS. 2-4, an airbag deployment algorithm 50, or any other required algorithms, can be stored in ROM and automatically executed by the controller 16 to provide the required functionality.

Figure 2:
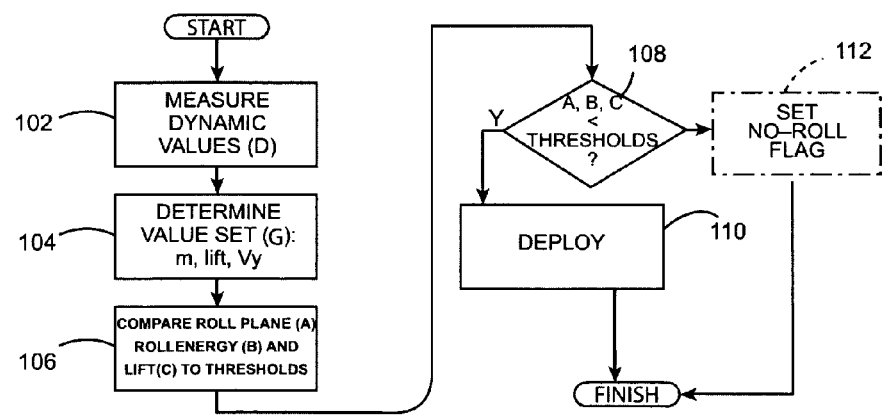
FIG. 2 is a graphical flow chart describing an algorithm suitable for executing the method of the invention.

Referring to FIG. 2, the algorithm 100 resident within or accessible by the controller 16 of FIG. 1 considers the inertia force of the vehicle 10, such as the lateral acceleration ($a_y$), and any duration of the action of this inertia force, a duration or interval referred to hereinafter as the stopping time (T). Within the scope of the invention, rollover detection is based on a measured roll angle ($\phi$), a calculated or derived roll rate ($\dot\phi$), the stopping time (T), a calculated roll energy rate ($\dot E$), and an amount of lift of the wheels 12 with respect to the surface 25.

Beginning at step 102, a set of dynamic values (D) is measured, sensed, detected, calculated, and/or otherwise determined. In particular, the lateral corner forces $F_{y,FL}$, $F_{y,FR}$, $F_{y,RL}$, and $F_{y,RR}$, as well as the vertical corner forces $F_{z,FL}$, $F_{z,FR}$, $F_{z,RL}$, and $F_{z,RR}$, are each determined using the sensors 14 of FIG. 1, while the yaw rate (r) is determined using the sensor 18. Likewise, the roll angle and roll rate ($\phi$ and $\dot\phi$, respectively) are detected and/or calculated or derived using the sensor 19. These values are then relayed or transmitted to the controller 16, along with the vehicle speed or velocity ($V_x$), and are temporarily stored or recorded in memory 23 therein. The algorithm 100 then proceeds to step 104.

At step 104, the controller 16 processes the information from step 102 using the CPU 21 to thereby calculate a value set (G). Value set (G) includes the stopping time (T) and a status determination describing whether any of the wheels 12 are lifting from the road surface 25. The controller 16 also calculates or estimates the lateral velocity ($V_y$) of the vehicle 10, as described below. Also at step 104, the controller 16 estimates the mass (m) of the vehicle 10 as set forth below.

Estimation of vehicle stopping time (T) can be determined in a representative soil trip event, i.e., a lateral movement of a vehicle into a sand bed. Such an event represents approximately 91% of the trip-over events occurring in the field for passenger cars, and approximately 93% for light truck vehicles or LTV. Stopping time (T) can be calculated using the equation:

$$V_y - a_o T - a_1(T^2/2) = 0,$$

where $V_y$ is the lateral velocity of the vehicle 10, and wherein $a_0$ and $a_1$ are predetermined parameter values, as will be understood by those of ordinary skill in the art.

Figure 3:
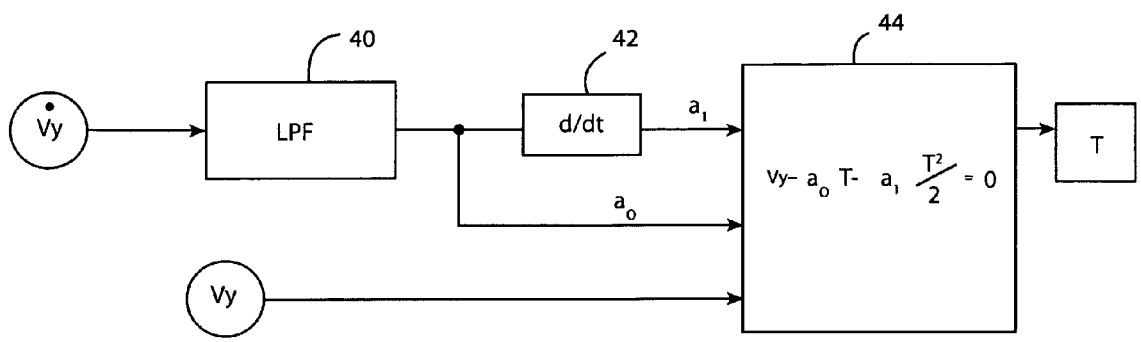
FIG. 3 is a graphical logic flow diagram describing a portion of the algorithm of FIG. 2.

Referring briefly to FIG. 3, the derivative of the lateral velocity or $\dot V_y$ can be passed through a low-pass filter (LPF) 40 to account for transient noise. The derivative of this value, or $\dot a_y$, can be calculated at block 42 and used as the value or parameter a1, while the value of $\dot V_y$ itself can be used as the parameter a0. The lateral velocity ($V_y$) can thus be estimated at block 44 using the four corner force measurements from the sensors 14, i.e.,:

$$dV_y/dt = 1/m[F_{y,FL} + F_{y,FR} + F_{y,RL} + F_{y,RR}] - rV_x$$

where m represents the estimated mass of the vehicle 10, r is the measured yaw rate of the vehicle 10.

Referring again to FIG. 2, and step 104 the mass (m) of the vehicle 10 can be estimated using the equation:

$$m = 1/g \sum_1^4 F_{corner,i}$$

wherein the vertical forces at the corners, i.e., $F_{corner, i}$, are measured when, and anytime, the vehicle 10 is at a standstill or vehicle velocity is zero. The result (m) thus represents the estimated mass of the vehicle 10.

Finally, wheel lift detection can be determined by comparing each of the corner forces in the vertical or z-direction, i.e., $F_{z,FL}$, $F_{z,FR}$, $F_{z,RL}$, and $F_{z,RR}$, to a calibrated minimum threshold ($F_{z, min}$), which can be determined offline and recorded or stored as a reference value in memory 23. For example, if $F_{z,FL}$ is less than $F_{z, min}$, than the front left (FL) wheel, i.e., wheel 12FL in FIG. 1, has lifted from the surface 25. Once all the value set (E) has been determined, the algorithm 100 proceeds to step 106.

At step 106, the algorithm 100 detects or otherwise determines whether the vehicle 10 is presently entering a trip-over event. As explained above, a trip-over event refers to a rollover event in which the lateral motion of the vehicle 10 is arrested by an opposing force, e.g., soft soil, a curb, a high-friction surface, etc. In making this determination, the algorithm 100 positions or locates a point 45 on a three-dimensional or x, y, z rollover plane and compares this position to a first threshold value. Additionally, the algorithm 100 calculates a roll energy rate ($\dot{E}$) and compares this value to a second threshold value, and also compares any calculated amounts of wheel lift to a third threshold.

Figure 4:
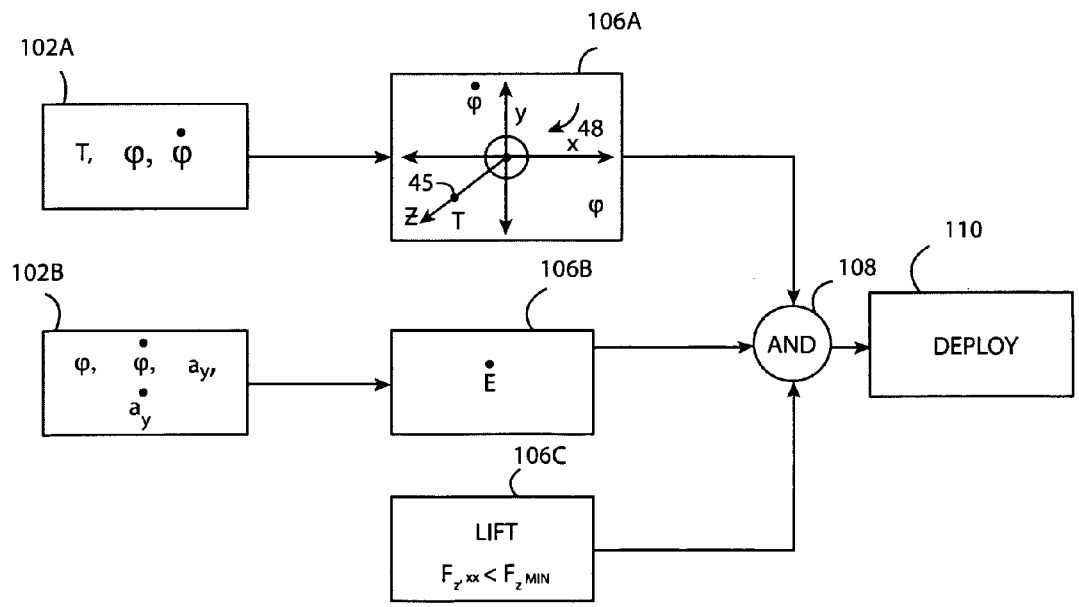
FIG. 4 is a graphical logic flow diagram describing another portion of the algorithm of FIG. 2.

Referring briefly to FIG. 4, the stopping time T, roll angle ($\phi$), and roll rate ($\dot{\phi}$) are each calculated or determined at step 102A to locate the point 45 on a three-dimensional or 3-axis plot 48, as shown in block 106A. The position of point 45 is then compared to the first threshold, represented as Threshold A in FIGS. 2 and 4. Likewise, at step 102B the roll angle ($\phi$), the roll rate ($\dot{\phi}$), and the angular acceleration ($a_y$) are used to calculate a roll energy rate or $\dot{E}$ at block 106B, which is then compared to threshold (B). The roll energy rate can be calculated as:

$$\dot{E}=\dot{\phi}\{m[a_{ym}(Y'\cos\phi+Z'\sin\phi)+a_{zm}(-Y'\sin\phi+Z'\cos\phi)]-I_{xz}\dot{r}\},$$

where $\dot{\phi}$ is the roll rate, m is the estimated vehicle mass, $a_{ym}$ is a measured lateral acceleration, Y' and Z' are derivatives of Y=Y($\phi$) and Z=Z($\phi$) with respect to $\phi$. Under a steady-state condition during the roll, the center of gravity of the sprung mass of the vehicle moves laterally and vertically, and follows the trajectory Y=Y($\phi$), Z=Z($\phi$). $\phi$ is the measured roll angle, $I_{xz}$ is the cross moment of inertia xz, and $\dot{r}$ is the derivative of the measured yaw rate (r). The amount of lift determined at step 104 is compared to the third threshold, represented as threshold C in FIGS. 2 and 4, at block 106C. The algorithm 100 proceeds to step 108 once the comparisons have been made.

At step 108, a determination is made as to whether the point 45 defined by (T, $\phi$, $\dot{\phi}$), the roll energy rate ($\dot{E}$), and the lift each exceed their calibrated threshold A, B, and C, respectively, as represented in FIG. 4 by the "AND" logic block 108. In the case of lift, this result is indicated when the vertical force is less than the required threshold. If all three minimum thresholds (A, B, and C) have been surpassed, the algorithm 100 proceeds to step 110, with the algorithm 100 otherwise proceeding to step 112.

At step 110, the controller 16 can automatically deploy one or more onboard devices as needed, for example by automatically deploying the side-curtain airbag 27, increasing tension on a seat belt using a tensioning device, etc. Alternately, step 110 can generate an indicator or a flag having a value corresponding to one of an imminent or present trip-over event, which is read by the algorithm 50 in an embodiment having a separate airbag deployment algorithm 50. If such a flag is used, it is recorded in memory 23, and the algorithm 100 is finished. If the airbag 27 is automatically deployed without recording the flag, the algorithm 100 is finished upon deployment of the airbags 27.

Referring again to FIG. 2, at step 112, which is shown in phantom in FIG. 2, the controller 16 can optionally generate an indicator or a flag indicating that no trip-over event or other rollover event is imminent, and records this flag in memory 23. As vehicle rollover is expected to be an extraordinary event, the non-event flag can be set upon vehicle launch or reset upon every start up cycle, with step 112 merely verifying that the non-event flag remains set. After recording or verification of a non-event flag, the algorithm 100 is finished.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   a plurality of wheels;
   a plurality of force sensors each adapted for measuring a vertical force and a lateral force at a different one of the plurality of wheels;
   a deployable device; and
   a controller in communication with the plurality of force sensors;
   wherein the controller has an algorithm configured for calculating a set of vehicle values using the vertical force and the lateral force, for comparing the set of vehicle values to a corresponding minimum threshold, and for automatically deploying the device when each value of the set of vehicle values does not exceed a corresponding calibrated threshold.

2. The vehicle of claim 1, wherein the corresponding calibrated threshold includes: a three-dimensional roll plane threshold value, a roll energy rate threshold value, and a wheel lift threshold value.

3. The vehicle of claim 2, further comprising a yaw rate sensor adapted for measuring a yaw rate of the vehicle and a roll angle sensor adapted for measuring a roll angle of the vehicle;
   wherein the algorithm is adapted for calculating the roll energy rate as a function of the roll angle, the yaw rate, and an estimated mass of the vehicle.

4. The vehicle of claim 3, wherein the controller is operable for estimating a lateral velocity of the vehicle as a function of each of the estimated mass of the vehicle, the vertical force, the lateral force, and the yaw rate; for calculating a stopping time using the lateral velocity; and for using the stopping time to determine the three-dimensional roll plane threshold value.

5. The vehicle of claim 3, wherein the controller is adapted for determining the estimated mass of the vehicle as a function of the vertical forces measured by the force sensors when the vehicle is at a standstill.

6. A vehicle comprising:
   a plurality of wheels;
   a plurality of sensors including a roll angle sensor connected to a vertical axis of the vehicle and a set of force sensors each connected to a different one of the wheels and adapted for measuring a vertical force and a lateral force at each of the plurality of wheels;
   a deployable side curtain airbag; and
   a controller in communication with the set of force sensors, the controller having an algorithm that is adapted for deploying the side curtain airbag in response to a threshold comparison between each of:
      a three-dimensional (3D) rollover plane defined by the roll angle, the roll angle rate, and a calculated stopping time;
      a calculated roll energy rate of the vehicle; and
      a lift status of each of the plurality of wheels;
   wherein the algorithm is configured for estimating a lateral velocity of the vehicle using a lateral force value from the set of force sensors, for calculating the calculated stopping time as a function of the lateral velocity, and for calculating the roll energy rate as a function of the roll angle.

7. The vehicle of claim 6, wherein the controller is operable for determining the lift status by comparing a vertical force of each wheel to a calibrated minimum threshold.

8. The vehicle of claim 6, wherein roll energy rate is also a function of the mass, the roll angle, and the cross moment of inertia of the vehicle.

9. The vehicle of claim 6, wherein the calculated stopping time is determined as a function of an estimated lateral velocity of the vehicle, and wherein the estimated lateral velocity of the vehicle is a function of each of the lateral force of each of the plurality of wheels, the estimated mass of the vehicle, the yaw rate of the vehicle, and a calibrated lateral velocity.

10. The vehicle of claim 6, wherein the set force sensors are configured as one of: a piston-in-cylinder device, a foil strain gage device, and a piezoelectric sensor device.

11. A method for determining when to deploy an airbag in a vehicle having a plurality of wheels, the method comprising:

measuring a vertical force and a lateral force at each of the plurality of wheels;

measuring a yaw angle of the vehicle using a yaw angle sensor;

measuring a roll angle of the vehicle using a roll angle sensor;

calculating an estimated lateral velocity of the vehicle using the lateral force;

calculating a lift of each wheel using the vertical force;

processing the roll angle, roll rate, and stopping time of the vehicle to thereby generate a point on a 3D rollover plane;

calculating a rollover energy rate of the vehicle; and automatically deploying the airbag when the point, the rollover energy rate, and the lift each have values less than a corresponding calibrated minimum threshold.

12. The method of claim 11, wherein calculating a rollover energy rate includes estimating a mass of the vehicle as a function of the vertical force at each wheel when the vehicle is at a standstill.

13. The method of claim 11, wherein calculating a lift of each wheel includes comparing a vertical force at each wheel to a calibrated minimum force.

14. The method of claim 11, wherein calculating an estimated lateral velocity of the vehicle includes estimating a mass of the vehicle as a function of the lateral force at each wheel when the vehicle is moving.

* * * * *